(12) United States Patent
Anderson et al.

(10) Patent No.: US 7,435,481 B2
(45) Date of Patent: Oct. 14, 2008

(54) MAR-RESISTANT GLASS-PLASTIC GLAZING PRODUCTS

(75) Inventors: Jerrel C. Anderson, Vienna, WV (US); Robert John Barsotti, Franklinville, NJ (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/709,640

(22) Filed: Feb. 22, 2007

(65) Prior Publication Data

US 2007/0154723 A1 Jul. 5, 2007

Related U.S. Application Data

(62) Division of application No. 10/925,842, filed on Aug. 25, 2004, now Pat. No. 7,294,401.

(60) Provisional application No. 60/499,949, filed on Sep. 2, 2003.

(51) Int. Cl.
 *B32B 27/30* (2006.01)
 *B32B 27/40* (2006.01)
 *B32B 27/36* (2006.01)

(52) U.S. Cl. .................. 428/423.7; 428/425.6; 428/437

(58) Field of Classification Search .............. 428/423.7, 428/425.6, 437
See application file for complete search history.

(56) References Cited

U.S. PATENT DOCUMENTS

| | | | |
|---|---|---|---|
| 3,979,548 A | 9/1976 | Schafer et al. | |
| 4,059,469 A | 11/1977 | Mattimoe et al. | |
| 4,584,229 A | 4/1986 | Bourelier et al. | |
| 4,652,494 A | 3/1987 | Bravet et al. | |
| 4,671,838 A | 6/1987 | Bravet et al. | |
| 4,784,916 A | 11/1988 | Bravet et al. | |
| 4,923,757 A | 5/1990 | O'Dwyer et al. | |
| 4,925,734 A | 5/1990 | Agethen et al. | |
| 4,973,511 A | 11/1990 | Farmer et al. | |
| 5,145,744 A | 9/1992 | Cartier et al. | |
| 5,560,959 A | 10/1996 | Shimoda et al. | |
| 5,567,529 A | 10/1996 | Smith | |
| 5,763,089 A | 6/1998 | Chaussade et al. | |
| 5,827,910 A | 10/1998 | Barsotti et al. | |
| 6,376,596 B1 | 4/2002 | Barsotti et al. | |
| 2002/0061395 A1 | 5/2002 | Moran et al. | |

FOREIGN PATENT DOCUMENTS

EP 0316873 A2 5/1988
WO WO97/44402 11/1997

OTHER PUBLICATIONS

PCT International Search Report, International Application No. PCT/US2004/028132, dated Aug. 27, 2004.
PCT International Preliminary Report—Written Opinion, Counterpart International Application No. PCT/US2004/028132, Feb. 3, 2006.

*Primary Examiner*—D. S Nakarani
(74) *Attorney, Agent, or Firm*—Kevin S. Dobson; Mark D. Kuller

(57) ABSTRACT

This invention is glass laminate article comprising a mar-resistant clear coat. A laminate of the present invention resists scratches, and is easily repairable and even self-healable at temperatures above about 40° C.

26 Claims, No Drawings

MAR-RESISTANT GLASS-PLASTIC GLAZING PRODUCTS

This application is a divisional of U.S. patent application Ser. No. 10/925,842, which is incorporated herein by reference, and which claims priority from U.S. Provisional Application No. 60/499,949, filed Sep. 2, 2003.

BACKGROUND OF THE INVENTION

1. Field of the Invention

This invention relates to laminated glass articles having scratch- and mar-resistant algometric coatings, and to a process for preparing such articles.

2. Description of the Prior Art

Base coat/clear coat systems are used conventionally in, for example, automobiles as finishes. Such systems are designed to protect the paint and finish of an automobile. Repairable mar-resistant coatings for automobile finishes are known and described in U.S. Pat. Nos. 5,827,910 and 6,376,596 B1, for example.

Coatings for transparent glass laminates are known. For example, polysiloxanes can be useful as a hard coating on polyethylene terephthalate (PET) films of windshield laminates. However, polysiloxane coatings can become permanently scratched by sharp objects. Over time the optical qualities of a transparent laminate can be greatly diminished due to an accumulation of scratches. In addition, polysiloxane coatings cannot be applied to laminates at a thickness greater than 2.8 microns, otherwise cracking may develop from routine handling of the coated film.

Repairable coatings for transparent laminates are known. For example, pre-formed scratch-resistant, self-repairable polyurethane sheets that can be adhesively applied to windshields as a two-layer coat are described in U.S. Pat. No. 4,784,916, U.S. Pat. No. 4,671,838, and U.S. Pat. No. 4,652,494.

SUMMARY OF THE INVENTION

In one aspect the present invention is a glass laminate article comprising: a clear coat/polymer film belayed wherein the clear coat is a scratch-resistant coating composition obtained from the combination of components (1) and (2), wherein component (1) comprises an algometric compound selected from the group consisting of algometric compounds having either hydroxyl functionality or anhydride functionality, and wherein component (2) is either an isocyanine bloomer or a compound having epoxy functionality.

In a preferred embodiment, component (1) is at least one hydroxyl-containing bloomer and component (2) is at least one isocyanine bloomer. Preferably the laminate comprises at least one layer of glass laminated to at least one layer of a thermoplastic polymer. Preferably the clear coat/polymer belayed is laminated to the thermoplastic polymer layer. Preferably the thermoplastic polymer is either PVB or an ethylene copolymer. In one preferred embodiment, the thermoplastic polymer is PVB. Preferably the polymer of the belayed component is PET. Preferably at the least one hydroxyl-containing bloomers is the reaction product of a multifunctional alcohol with a cyclic monomer anhydride then further reacted with a peroxide. Preferably the multifunctional alcohol is selected from the group consisting of: pentaerythritol, hexahedron, trimethylol propane, similar compounds, or mixtures thereof. Preferably the peroxide is selected from the group consisting of: 1,2-butylenes oxide; 2,3-butylenes oxide; propylene oxide; ethylene oxide; and similar compounds, or mixtures thereof. Preferably the hydroxyl-containing bloomer is a tetrahydroxy-containing bloomer. Preferably the isocyanine bloomer is an isocyanurate trimmer of hexamethylene discarnate.

In one preferred embodiment, the clear coat/polymer film belayed is adhesively bonded to glass without an intervening thermoplastic polymer layer between the glass and the belayed. Preferably component (1) is at least one hydroxyl-containing bloomer and component (2) is at least one isocyanine bloomer. Preferably the polymer of the belayed component is PET. Preferably the least one hydroxyl-containing bloomers is the reaction product of a multifunctional alcohol with a cyclic monomer anhydride then further reacted with an peroxide. Preferably the multifunctional alcohol is selected from the group consisting of: pentaerythritol, hexahedron, trimethylol propane, similar compounds, or mixtures thereof. Preferably the peroxide is selected from the group consisting of: 1,2-butylenes oxide; 2,3-butylenes oxide; propylene oxide; ethylene oxide; and similar compounds, or mixtures thereof. Preferably the hydroxyl-containing bloomer is a tetrahydroxy-containing bloomer. Preferably the equivalent ratio the hydroxyl bloomer to the isocyanine of bloomer is greater than 0.60 relative. Preferably the equivalent ratio is in the range of from about 0.70 to about 1.50, more preferably in the range of from about 0.80 to about 1.40, and even more preferably in the range of from about 0.90 to about 1.35. Preferably the isocyanine bloomer is an isocyanurate trimmer of hexamethylene discarnate.

In another embodiment, the invention is directed to an article comprising a clear coat on a polymeric film wherein the clear coat is the product of the combination of components (1) and (2) combined in an equivalent ratio of greater than 0.90, wherein (1) comprises an algometric compound selected from the group consisting of algometric compounds having either hydroxyl functionality or anhydride functionality, and wherein component (2) is either an isocyanine bloomer or a compound having epoxy functionality. Preferably the polymeric film is a polymer selected from the group consisting of polyurethanes, ethylene/acid copolymers, and PET. More preferably the polymeric film is PET.

The invention is further directed to an article comprising a clear coat on a polymeric film wherein the clear coat is the product of the combination of components (1) and (2) combined in an equivalent ratio in the range of from about 1.10 to about 1.35, wherein (1) comprises an algometric compound selected from the group consisting of algometric compounds having either hydroxyl functionality or anhydride functionality, and wherein component (2) is either an isocyanine bloomer or a compound having epoxy functionality, wherein component (1) has a molecular weight in the range of from about 300 to about 3000. More preferably component (1) has a molecular weight in the range of from about 400 to about 2,500, even more preferably in the range of from about 450 to about 2,000, and yet even more preferably in the range of from about 500 to about 1,500.

In another aspect, the present invention is a process for making a glass laminate article comprising the steps: combining two components, (1) and (2), to obtain a clear coat composition; (b) coating a polymer film by applying the clear coat composition onto the polymer film; (c) curing the clear coat composition on the polymer film to obtain a cured coated film; and (d) laminating the cured coated film onto a stack comprising at least one layer of glass to obtain a glass laminate; wherein the clear coat composition is a scratch-resistant coating composition and wherein component (1) comprises an algometric compound selected from the group consisting of algometric compounds having either hydroxyl functionality or anhydride functionality, and wherein component (2) is either an isocyanine bloomer or a compound having epoxy functionality.

In still another embodiment, the present invention is a process for making a glass laminate article comprising the steps: combining two components, (1) and (2), to obtain a clear coat composition; (b) coating a polymer film by applying the clear coat composition onto the polymer film; (c) curing the clear coat composition on the polymer film to obtain a cured coated film; and (d) applying a coat of an adhesive composition to a second side of the cured coated film, and (e) applying the cured film to a substrate by contacting the adhesive-coated surface of the cured film to a surface of the substrate comprising at least one layer of glass to obtain a glass laminate; wherein the clear coat composition is a scratch-resistant coating composition and wherein component (1) comprises an algometric compound selected from the group consisting of algometric compounds having either hydroxyl functionality or anhydride functionality, and wherein component (2) is either an isocyanine bloomer or a compound having epoxy functionality.

The invention is also directed to a process for removing defects from the surface of a transparent laminate comprising the step: heating the defective surface of the laminate to at least 70° C., wherein the surface comprises a clear coat obtained by combining two components, (1) and (2), at an equivalent ratio of at least 0.90 (component (l):component (2)) and wherein component (1) comprises an algometric compound selected from the group consisting of algometric compounds having either hydroxyl functionality or anhydride functionality, and wherein component (2) is either an isocyanine bloomer or a compound having epoxy functionality.

DETAILED DESCRIPTION OF THE INVENTION

In one embodiment, the present invention is a glass laminate comprising a mar-resistant clear coat. A glass laminate of the present invention comprises at least one layer of glass that is laminated to at least one layer of a thermoplastic polymer interlayer. The thermoplastic polymer interlayer can be any polymeric material that is known and used conventionally in the manufacture of glass laminates. For example, the thermoplastic polymer can be selected from (i) polyurethane (PU), (ii) polycarbonate (PC), (iii) polyvinylbutyral (PVB), (iv) polyesters such as polyethylene terephthalate (PET) or (v) an ethylene acid copolymer obtained from the copolymerization of ethylene with an $\alpha,\beta$-unsaturated carboxylic acid, or a derivative thereof. A combination of various conventional interlayer materials can be used in the practice of the present invention. Preferably, the interlayer material is selected from PVB and an ethylene acid copolymer or a derivative thereof. Suitable acid derivatives useful in the practice of the present invention are known to those skilled in the art, and include esters, salts, anhydrides, amides, and the like. Acid copolymers can be fully or partially neutralized to the salt (or partial salt). Fully or partially neutralized acid copolymers are known conventionally as monomers. Suitable copolymers can include an optional third monomer constituent which can be an ester of an athletically unsaturated carboxylic acid. Suitable acid copolymers useful in the practice of the present invention can be purchased commercially from, for example, E. I. DuPont de Nemours and Company under the trade names of Surlyn® and Nucrel®, for example.

The laminate further comprises a second polymeric layer that is laminated to the interlayer on a second surface that is not laminated to the glass. The second polymeric layer can be any that is clear or transparent and can adhesively bond to both the interlayer and the clear coat composition, such as polyurethane, PET, and ethylene/acid copolymers, for example. Preferred in the practice of the present invention as the second polymeric layer is PET.

The clear coat is coated onto the second polymeric layer. The clear coat can be formed from either (A) the combination of at least one hydroxyl-containing bloomer with at least one isocyanine bloomer, or (B) the combination of at least one anhydride-containing bloomer with at least one peroxide-containing compound. Suitable bloomers for use in the practice of the present invention are particularly described and can be obtained as described in WO 9744402 and in U.S. Pat. No. 5,827,910.

Suitable hydroxyl-containing bloomers can be obtained by reacting multifunctional alcohols such as pentaerythritol, hexahedron, trimethylol propane, similar compounds, or mixtures thereof, with cyclic monomer anhydrides such as hexahydrophthalic anhydride, methylhexalhydrophthalic anhydride, and the like, and further reacting the acid bloomers thus obtained with nonfunctional epoxy compounds such as butylenes oxide, propylene oxide, similar compounds, or mixtures thereof. Hydroxyl-containing bloomers suitable for use in the practice of the present invention can have a molecular weight in the range of from about 300 to about 3,000. Preferably, the molecular weight of a hydroxyl-containing bloomer is in the range of from about 400 to about 2,500. More preferably, the molecular weight is in a range of from about 450 to about 2,000, and most preferably in the range of from about 500 to about 1,500.

Suitable isocyanine bloomers are, for example: the isocyanurate trimmer of hexamethylene discarnate; DESMODUR® 3300 available from Bayer; Tolonate® HDT available from Rhoda; and the isocyanurate trimmer of isochrones demine, and the like.

Suitable anhydride bloomers are linear anhydrides having a structure defined by the general formula: R—CO—O—CO-(R'—CO—O—CO)$_n$—R, wherein R is a monosubstituted hydrocarbon group having from 2 to 50 carbon atoms, R' is a di-substituted hydrocarbon group having from 2 to 50 carbon atoms, the hydrocarbon R and R' groups containing or not containing an ether linkage, urethane linkage, or ester linkage, and n is an integer from 1 to 500. Also suitable are anhydrides having a molecular weight of less than about 2000 comprising (1) a central moiety, and (2) greater than one non-cyclic anhydride moieties bonded to each central moiety. Anhydrides suitable for use as an anhydride (b) type anhydride can be obtained by reacting multifunctional alcohols such as pentaerythritol, hexahedron, trimethylol propane, and the like, with cyclic monomer anhydrides such as hexahydrophthalic anhydride, methylhexalhydrophthalic anhydride, and the like, and further reacting the acid bloomers thus obtained with ketene.

Suitable epoxy bloomers are, for example, the diglycidyl ester of cyclopean dicarboxylic acid such as Araldite® CY-184 from Ciba Geigy, and cycloaliphatic epoxies such as ERL®-4221, available from Union Carbide, and the like. In another embodiment, the present invention is a process for making a laminate comprising the step of preparing a clear coat composition. A clear coat of the present invention can be obtained by combining at least one algometric component (1) compound with at least one algometric component (2) compound. It is preferable that if component (1) is a hydroxyl-containing bloomer, that component (2) be an isocyanine-containing bloomer, and that if component (1) is an anhydride containing bloomer, that component (2) is an peroxide-containing bloomer. For example, at least one suitable hydroxyl-containing bloomer can be combined with at least one suitable isocyanine bloomer. The isocyanine and hydroxyl bloomers can be combined in a stoichiometric ratio that will result in all of the hydroxyl functionality present being reacted with the isocyanine functionality, that is, with a slight stoichiometric excess of isocyanine being present after all of the hydroxyl functionality has been reacted. Preferably, however, a stoichiometric excess of hydroxyl component is added such that some residual hydroxyl functionality remains after all of the isocyanine functionality is reacted. A molar equivalent, as used herein, is the number of moles of a reactant, such as component (1) required to completely react with one mole of the other reactant, for example component (2). The equivalent ratio is a ratio that can be easily determined by one of ordinary skill in the art by dividing the number of moles of a reactant actually present by the number of moles required for a complete reaction. The equivalent ratio of hydroxyl bloomer to isocyanine bloomer (HY:ISO) is greater than 0.60. Preferably the ratio is in the range of from about 0.70 to about 1.50, more preferably in the range of from about 0.80 to about 1.40; and most preferably in the range of from about 0.90 to about 1.35. In a particularly preferred embodiment, the equivalent ratio of the hydroxyl bloomer to the isocyanine bloomer is in the range of from about 1.10 to about 1.35 with the tetra hydroxyl bloomer. It has been found, surprisingly, that higher HY:ISO ratios result in faster healing of scratches and nicks, and at lower temperature. An anhydride bloomer is preferably combined with an peroxide-containing bloomer in a stoichiometric ratio such that an excess of epoxy remains after all of the anhydride is reacted. Preferably, the equivalent ratio of epoxy bloomer to anhydride is at least 0.70, and preferably from about 0.70 to about 1.40. More preferably the equivalent ratio of peroxide to anhydride is from about 0.90 to about 1.30, and most preferably from about 1.00 to about 1.25.

It is preferable that the clear coat components (1) and (2) be combined just prior to being applied to the polymer film. Preferably components (1) and (2) are combined less than about 60 minutes prior to the application to the polymer film. After application of the clear coat to the polymer film, the coating can be allowed to sit for a period, typically less than 30 minutes, at room temperature prior to being placed in a heated environment to cure the clear coat. The coatings can be cured at a temperature of at least about 100° C., preferably above 120° C., and most preferably above 125° C. but below about 150° C.

Cured coated polymer films obtained as described herein are optically clear films having low haziness and good see-through clarity.

A laminate comprising the cured clear coat can be obtained by laminating the coated polymer film to a suitable material as described herein. The lamination process used herein can be any that is known or conventional in the art. However, the preferred lamination process may depend on the specific details of the lamination, including the structure of the laminate and/or the materials used to build the laminate. For example, a laminate assembly can be constructed using suitable materials and placing them in the order desired in the assembly. Preferably in the practice of the present invention a glass cover plate is used to cover and protect the exposed surface of the clear coat film. In some cases it can be desirable to place the assembly in bag, which is in turn placed into a vacuum chamber, remove as much air as possible from the bag and chamber, and then seal the bag while still under vacuum. A laminate assembly whether vacuum-bagged or not, can then heated in an oven set at 90-150° C. for at least about 20 minutes. The oven can be an autoclave, wherein the assembly can be subjected to temperatures above about 125° C. and pressures above about 12 atmospheres. The exact time can depend on the conditions employed, but the temperature and pressure are maintained at the desirable levels for at least about 9 minutes before cooling and depressurizing the autoclave.

In a preferred embodiment, a laminate of the present invention can be obtained by coating the un-coated surface of the polymer film—that is the surface intended to be laminated to the glass surface—with an adhesive composition, followed by contacting the adhesive-coated surface of the polymer film with a glass surface. The adhesive can be a moisture activated adhesive. In such case, either or both the glass surface and/or the adhesive coated surface of the polymer film can be wet prior to contacting the two surfaces. In some cases it can be preferred that the glass surface is wet prior to bringing the glass into contact with the adhesive coated surface of the polymer film. In other cases it can be preferred to wet the adhesive-coated surface of the film. In still other cases it can be preferred to wet both surfaces prior to bringing them into contact with each other. For example, an aqueous mixture of Elvanol® polyvinyl alcohol, available from E. I. DuPont de Nemours and Company, can be suitable for use herein as a water activated adhesive.

Other adhesives can be used wherein water activation is not required. For example, in U.S. Pat. Pub. No. US2002/0061395 A1 is described an adhesive that is suitable for use herein. In a preferred embodiment, an adhesive that does not include water, and/or does not require activation by water, can be desirable in order to avoid problems that can result from water that is absorbed or trapped by the laminate.

In any case, suitable adhesives for the purposes of the present invention are known. For example suitable adhesives are described in U.S. Pat. No. 4,973,511. Suitable adhesives are transparent adhesives that can include: polyester adhesives described in DuPont Technical Bulletin No. 17 entitled "Polyester Adhesives", specifically adhesives No. 46960, 46971, and 46690 therein; polyamide adhesives such as, for example "Versalon" 1140 (General Mills); and/or vinyl resin-based adhesives that are conventionally used in the construction of laminate safety glass.

In still another embodiment, the present invention is a laminate comprising a polymer film coated with a mar-resistant coating of the present invention, wherein the polymer film is adhesively bonded directly to glass, without an intervening layer of thermoplastic interlayer between the glass and the coated polymer film. For example, it can be desirable in some applications to exclude PVB from the laminate structure, and adhesively bond a coated PET film to glass.

A laminate of the present invention has excellent durability, impact resistance, toughness, and resistance by the interlayer to cuts, scratches, nicks, and the like. A laminate of the present invention that is scratched can be easily repaired by applying heat to the clear coat layer of the laminate. A scratch produced on a coated laminate of the present invention can be removed (healed) by heating the scratched laminate to a temperature of at least about 30° for at least about 15 minutes. Preferably, the laminate surface is heated to a temperature of at least about 35° C. for at least about 30 minutes, and more preferably 40° C. for at least about 30 minutes. Even more preferably, a scratched laminate is heated to a temperature of at least about 60° C. for at least about 45 minutes. Most preferably, a scratched laminate can be healed by heating the laminate surface to a temperature of at least about 70° C. for at least about 60 minutes.

A laminate of the present invention can be useful in an automobile as windshields and/or sidelights and/or moon roofs. A laminate of the present invention can also be particularly useful in architectural applications, in buildings for example. A laminate of the present invention can be easily cleaned and is resistant to spalling, and penetration by projectiles.

EXAMPLES

The Examples are for illustrative purposes only, and are not intended to limit the scope of the invention.

Example 1

A coating formulation (A) was prepared by combining 71.1 wt % of Part 1 with 28.9 wt % of Part 2. Part 1 consists of: 56.87 wt % tetra hydroxyl bloomer (obtained as described in Procedure 1 of U.S. Pat. No. 6,376,596); 0.68 wt % of 10% BYK 301 in propylene glycol monomethyl ether acetate, available from Byk Chemie; 2.8 wt % of a mixture of 1% deputy tin deflagrate in methyl ethyl ketene; and 10.75 wt % butyl acetate. Part 2 is Tolonate® HDT LV, which is an isocyanurate trimmer of hexamethylene discarnate available from Rhoda. Weight percentages are based on the total weight from the combination of Part 1 and Part 2.

Example 2

A coating formulation (B) was prepared by combining 72.04 wt % of Part 1 with 27.96 wt % of Part 2. Part 1 consists of: 28.73 wt % tetra hydroxyl bloomer (obtained as described in Procedure 1 of U.S. Pat. No. 6,376,596B1); 29.09 wt % of dihydroxyl bloomer (obtained as described in Procedure 2 of U.S. Pat. No. 6,376,596B1); 0.68 wt % of 10% BYK 301 in propylene glycol monomethyl ether acetate, available from Byk Chemie; 2.77 wt % of a mixture of 1% deputy tin deflagrate in methyl ethyl ketene; and 10.77 wt % butyl acetate. Part 2 is Tolonate® HDT LV, which is an isocyanurate trimmer of hexamethylene discarnate available from Rhodia. Weight percentages are based on the total weight from the combination of Part 1 and Part 2. Part 1 and Part 2 are mixed just prior to application to substrate surface.

Example 3

A coating formulation (D) was prepared by combining 65.79 wt % of Part 1 with 34.21 wt % of Part 2. Part 1 consists of: 26.17 wt % anhydride resin with pendant groups (as described in Example 1A of U.S. Pat. No. 5,827,910); 24.53 wt % of linear anhydride (as described in Example 1B of U.S. Pat. No. 5,827,910); 1.23 wt % of 10% BYK 301 in propylene glycol monomethyl ether acetate, available from Byk Chemie; 1.23 wt % of a mixture of 25% tetra butyl phosphonium chloride in propylene glycol monomethyl ether acetate; 1.45 wt % of a mixture of 25% Niax A-99 (a tertiary amine available from Union Carbide) in methyl ethyl ketene; and 7.86 wt % butyl acetate. Part 2 is diglycidyl ester of 1,2-cyclopean dicarboxylic acid available from Ciba-Geigy as Araldite®CY-184. Weight percentages are based on the total weight from the combination of Part 1 and Part 2. Part 1 and Part 2 are mixed just prior to application to substrate surface.

Examples 4-8

The coating compositions A, B, and D of Examples 1-3 were each coated onto 4 mil polyethylene terephthalate films which surfaces had been previously flame treated to improve adhesion. The coated film samples were kept at room temperature for 5-10 minutes after coating, and then baked for 30 minutes at 140° C. to cure the coatings. The coating thicknesses were varied as described in Table 1. Scratch behavior, abrasion resistance, coating adhesion, and the effects of immersion in boiling water on coating adhesion and haze were tested according to the methods described below. The results of the tests are described in Tables 1-4 below.

Examples 9-14

The coating compositions A and B of Examples 1-2 were each coated—using a #30 wire wound rod fitted on a RESOURCE I lab coater device—onto 4 mil polyethylene terephthalate films which had been previously had the surfaces flame treated to improve adhesion. The coated film samples were kept at room temperature for 10 minutes after coating, and then baked for 30 minutes at either 100° C., 120° C., or 140° C. in a hot air oven to cure the coatings. The coating thicknesses were 28-36 microns for the "A" composition and 32-37 microns for the "B" composition.

Example 15

General Lamination Procedure

A glass laminate assembly is constructed as follows: glass/PVB/PET/clearcoat/coverplate. The cover plate can be any rigid material, but is generally float glass. While any surface pattern on the cover plate can be used, for optical applications a smooth surface is desirable. The multilayer construction can be laminated according to conventional techniques. The assemblies described herein are vacuum bagged according to the following procedure. A laminate construction is placed in a plastic bag, which is then placed into a vacuum chamber, which is evacuated to remove air, and thermally sealed while still under vacuum. The vacuum-bagged construction is placed in an autoclave and subjected to a pressure of about 17 atmospheres, and a temperature of about 125° C. to about 150° C. for 30 minutes. The chamber is depressurized and cooled. The laminate is removed from the bag and the cover plate is removed.

Examples 16-21

The cured coated films of Examples 9-14 were laminated to glass in an autoclave using the lamination procedure of Example 15, at an autoclave temperature of 140° C. Glass cover plates were used, the cover plates were washed with water containing 350 parts per million (ppm) $MgSO_4$ before use to prevent sticking between the cover plate and the clear coat. The laminates obtained were optically flat and smooth, and the cover plates easily removed.

Scratch Behavior

Scratch behavior for each sample tested was determined using a Taber Shear/Scratch Tester, Model 502, fitted with a diamond stylus lapped to a 90° included angle with a 0.003-inch radius tip. The stylus was positioned on the arm of the tester at an angle of 90° to the surface of the coated film being tested. The coated film sample was positioned horizontally on the disc of the tester with the coated side facing upward to receive the stylus. A given weight was applied to the arm by sliding the weight to a marked position along the arm. The arm with stylus was lowered into contact with the coated film and the disc with attached coated film was rotated at a speed of 0.5 inches/second. The stylus path was then inspected for any scratch, and any visible scratch measured for width. This process was repeated using different weights on the stylus arm. After the degree of visibility and actual scratch width are recorded, the sample was heated in an oven held at 70° C. for 30 minutes to determine the affect on scratch visibility and width. The results for Examples 4-8 are shown in Table 1.

TABLE 1

| Example | Thickness (microns) | State[1] | Scratch Width[a] (mm) | Scratch Width[b] (mm) | Scratch Width[c] (mm) | Scratch Width[d] (mm) | Scratch Width[e] (mm) |
|---|---|---|---|---|---|---|---|
| 4 | 30 to 40 | AS | NV[2] | 0.033 | 0.050 | 0.058 | 0.098 |
| 4 | | AH | NV | NV | 0.048 | 0.054 | 0.093 |
| 5 | 10 to 15 | AS | 0.035 | 0.047 | 0.058 | 0.068 | 0.099 |
| 5 | | AH | NV | NV | 0.043 | 0.054 | 0.071 |
| 6 | 30 to 40 | AS | 0.029 | 0.046 | 0.058 | 0.067 | 0.104 |
| 6 | | AH | NV | NV | NV | NV | NV |
| 7 | 20 | AS | NV | 0.040 | 0.051 | 0.065 | 0.096 |
| 7 | | AH | NV | NV | NV | 0.053 | 0.077 |
| 8 | 30 to 40 | AS | NV | 0.031 | 0.049 | 0.063 | 0.124 |
| 8 | | AH | NV | NV | NV | NV | NV |

[1]AS = As Scratched; AH = After Heating at 70° C. for 30 minutes.
[2]NV = scratch not visible
[a]Stylus weight 20 grams.
[b]Stylus weight 30 grams.
[c]Stylus weight 40 grams.
[d]Stylus weight 50 grams.
[e]Stylus weight 100 grams.

Abrasion Resistance

Abrasion resistance was evaluated using the Taber Abrasion test as defined in ANSI Z-26.1, Test Number 34. In this test the sample surface is abraded by a CS-10F abrader wheel under 500 grams weight for 100 revolutions. The increase in haze of the clear sample in the abraded lane is measured and expressed as the Taber Haze in percent. The clear-coated samples were abraded on the coated sides, and measured for Taber Haze, then heated and held in an oven held at 70° C. for 30 minutes. The Taber Haze was determined again after removal from the oven to determine whether heating diminished the abrasion scarring. The results are reported in Table 2.

TABLE 2

| Example | Coating Thickness (microns) | Taber Haze[a] (%) initial | Taber Haze[a] (%) after heating |
|---|---|---|---|
| 4 | 30-40 | 25.8 | 13.6 |
| 5 | 10-15 | 38.2 | 24.6 |
| 6 | 30-40 | 36.2 | 20.8 |
| 7 | 20 | 24.2 | 13.1 |
| 8 | 30-40 | 23.1 | 11.7 |

[a]100 revolutions/500 grams

Optical Properties

To determine the optical properties of the films, film samples were immersed in boiling water for two hours and 6 hours and the Gardner Haze value determined according to the procedures of ASTM D 1003-61 (Reapproved 1977). The films had good see-through clarity and low haziness. The results are reported in Table 3.

TABLE 3

| | Gardner Haze (%) | | |
|---|---|---|---|
| | | after heating | |
| Example | initial | 2 hrs | 6 hrs |
| 4 | 1.1 | 3.8 | 12.5 |
| 6 | 0.6 | 5.5 | 4.0 |
| 8 | 1.0 | 8.1 | 12.4 |

Coating Adhesion

Coating adhesion was determined according to ASTM D3359-87 Tape Test using PERMACEL™ tape having a peel strength against a stainless steel of 40 ounces per inch. The adhesion was measured before and after immersion in boiling water for 2 hours and for 6 hours. The results of the adhesion test are given Table 4.

TABLE 4

| | Coating Adhesion (% Coating Retained) | | |
|---|---|---|---|
| | | After immersing in boiling water | |
| Example | Initial | 2 hrs | 6 hrs |
| 4 | 100 | 100 | 100 |
| 6 | 100 | 100 | 100 |
| 8 | 100 | 100 | 100 |

Examples 22-27

Coating formulations were prepared by combining Part 1 with Part 2 in various ratios, such that the equivalent ratio of hydroxyl to isocyanine was varied as indicated in Table 5. Part 1 consists of: 56.87 wt % tetra hydroxyl bloomer; 0.68 wt % of 10% BYK 301 in propylene glycol monomethyl ether acetate, available from Byk Chemie; 2.8 wt % of a mixture of 1% deputy tin deflagrate in methyl ethyl ketene; and 10.75 wt % butyl acetate. Part 2 is Tolonate® HDT LV, which is an isocyanurate trimmer of hexamethylene discarnate available from Rhodia. Weight percentages are based on the total weight from the combination of Part 1 and Part 2.

TABLE 5

| Example | Part 1 | Part 2 | Equivalent Ratio |
|---|---|---|---|
| 22 | 12.30 | 5.00 | 0.95 |
| 23 | 14.15 | 5.00 | 1.09 |
| 24 | 16.00 | 5.00 | 1.24 |
| 25 | 12.90 | 5.00 | 0.95 |
| 26 | 14.85 | 5.00 | 1.09 |
| 27 | 16.80 | 5.00 | 1.24 |

Examples 28-33

PET clear coated films were obtained by coating the above coating compositions at a thickness 7 mil onto PET film. Laminates were made according to the procedure of Example 15 and were evaluated for optical properties and performance after autoclaving. The laminates did not change color, remained clear and free of haze, conformed perfectly to the cover plate to yield an optically flat surface, and release readily from the cover plate with no tendency to stick. The results are tabulated in Table 6.

TABLE 6

| Example | Transparency (%) | Haze (%) | Clarity (%) | 20° Gloss | YID Color |
|---|---|---|---|---|---|
| C1[1] | 92.8 | 0.09 | 100 | 101.3 | 0.30 |
| C2[2] | 89.8 | 0.61 | 99.7 | 153.7 | 1.60 |
| 28[a] | 91.9 | 1.08 | 99.7 | 99.3 | 1.47 |
| 29[b] | 91.6 | 0.73 | 99.6 | 104.3 | 1.45 |
| 30[c] | 91.9 | 0.57 | 99.8 | 103.6 | 1.52 |
| 31[d] | 91.9 | 0.79 | 99.6 | 103.1 | 1.46 |
| 32[e] | 91.7 | 0.59 | 99.7 | 105.8 | 1.56 |
| 33[f] | 91.9 | 1.29 | 99.7 | 103.0 | 1.41 |

[1] 90 mil glass, not an example of the present invention
[2] 7 mil PET film, not an example of the present invention
[a] Laminate obtained from film of Example 22.
[b] Laminate obtained from film of Example 23.
[c] Laminate obtained from film of Example 24.
[d] Laminate obtained from film of Example 25.
[e] Laminate obtained from film of Example 26.
[f] Laminate obtained from film of Example 27.

TABLE 7

| Example | Stylus Load (grams) | Scratch Visibility After heating for 1 hour at: | | | | |
|---|---|---|---|---|---|---|
| | | 25° C. | 40° C. | 50° C. | 60° C. | 70° C. |
| C1 | 50 | V[1] | V | V | V | V |
| C1 | 100 | V | V | V | V | V |
| C2 | 50 | V | V | V | V | V |
| C2 | 100 | V | V | V | V | V |
| 28 | 50 | V | V | V | V | NV |
| 28 | 100 | V | V | V | V | NV |
| 29 | 50 | V | V | V | V | NV |
| 29 | 100 | V | V | V | V | NV |
| 30 | 50 | V | V | V | NV | NV |
| 30 | 100 | V | V | V | V | NV |
| 31 | 50 | V | NV | NV | NV | NV |
| 31 | 100 | V | NV | NV | NV | NV |
| 32 | 50 | V | NV | NV | NV | NV |
| 32 | 100 | V | NV | NV | NV | NV |
| 33 | 50 | NV | NV | NV | NV | NV |
| 33 | 100 | V | V[4] | BV[3,4] | BV[4] | BV[4] |

[1] V = Visible to the unaided eye.
[2] NV = Not visible to the unaided eye.
[3] BV = Barely visible to the unaided eye.
[4] The stylus penetrated through to the PET film surface.

Examples 34-35

Two laminates were prepared as described in Example 15, using the coating composition described below in Table 8a. The laminates were then subjected to the XENOTEST® 1200 CPS tested conducted using ASTM G26-90 METHOD A. The samples were exposed to 1,515 MJ/m² UV radiation (300-400 nm) for a total time of 5,260 hours. The exposed laminates were measured for Gardner Haze (ASTM 1003-61), 20° gloss, and coating adhesion by the ASTM tape adhesion test (ASTM 3359-97). Results are shown in Table 8b. The samples were also visually inspected for yellowness and see-through clarity.

TABLE 8a

| Coating Composition | Ex 34 | Ex 35 |
|---|---|---|
| Part 1 (Hydroxyl Oligomer) | 30.0 g | 30.0 g |
| Part 2 (isocyanate) | 11.64 g | 9.90 g |
| Equivalent Ratio Part 1/Part 2 | 0.95 | 1.12 |

The samples did not show any visual color change and clarity was considered good. Some hazing occurred due to the XENOTEST® water spray cycles.

TABLE 8b

| Example | Haze (%) | 20° Gloss | | Tape Adhesion | | |
|---|---|---|---|---|---|---|
| | | control | exposed | Cross hatch | unscribed | x-scribed |
| 34 | 1.6 | 108 | 96.3 | 30 | 100 | 100 |
| 35 | 2.2 | 124 | 124 | 100 | 100 | 100 |

Example 36

A clear 7 mil flame treated PET film was coated on one side with a water solution of an ELVANOL® PVA formulation to serve as a water-activated adhesive, and was coated on the other side with the algometric clear coat described in Examples 34 (B1) to serve as a scratch resistant healable coating. The film was bonded to glass by wetting the glass and/or the film on the adhesive coated side followed by pressing the wetted film to the glass using a rubber roller or "squeegee" to remove all excess water. The glass and film bonded structure was then allowed to dry at room temperature until the adhesive was dry, that is until the moisture diffused through the PET film and the adhesive layer was "set" and the film was firmly adhered to the glass.

Example 37

A 7 mil clear CRONAR® PET film, flame treated on both sides, was coated on one side with a 15% water solution containing ELVANOL® type 51-05 powder using a #28 wire-wound coating rod. The coating was allowed to dry at room temperature before coating the opposite side with the clear coat formulation described in Examples 34 (B1). The formulation was applied coated using a # 28 wire-wound coating rod. The coating was allowed to flash off solvent at room temperature and then allowed to sit at room temperature for 24 hours before the application of the clear coated PET film to the glass (see "Glass Application Procedure", Example 39 below).

Example 38

A 7 mil clear CRONAR® PET film, flame treated on both sides, was coated on one side with a 15% water solution containing ELVANOL® type 51-05 powder using a #28 wire-wound coating rod. The coating was allowed to dry at room temperature before coating the opposite side with the clear coat formulation described in Examples 35 (B2). The formulation was applied coated using a # 28 wire-wound coating rod. The coating was allowed to flash off solvent at room temperature and then allowed to sit at room temperature for 24 hours before the application of the clear coated PET film to the glass (see "Glass Application Procedure", Example 40 below).

Glass Application Procedure

Example 39

The coated film of Example 37 was attached to 90 mil thick annealed float glass by (1) spraying the glass surface with a mist of water, (2) laying the coated film onto the wet glass with the ELVANOL® coated side to the glass, and (3) pressing the film onto the glass using a rubber bladed "squeegee", using multiple passes to eliminate all excess water from the interface. The coated film/glass structure was allowed to dry for several days before being tested for scratch resistance and optical properties. The dried structure was very clear and colorless and the film was adequately bonded to the glass.

Example 40

The coated film of Example 38 was attached to 90 mil thick annealed float glass according to the procedure of Example 39.

TABLE 9

| Example | Haze (%) | Transmission (%) | Clarity (%) | YID |
|---------|----------|------------------|-------------|------|
| C3[1]   | 2.2*     | 90.8             | 98.4        | 0.55 |
| 39      | 0.9      | 92.0             | 98.6        | 0.52 |
| 40      | 0.6      | 92.1             | 98.8        | 0.70 |

[1]Uncoated PET/PVA/Glass, not an example of the present invention.
*The uncoated PET film was abraded by the squeegee and gave a higher haze reading, i.e. no clearcoat to protect from scratching.

The film/glass structures of Examples 39 and 40 were subjected to the Taber scratch test, as described above, using scratch loads of 50 and 100 grams. The scratched samples were measured for scratch width using a microscope, and for visibility with the unaided eye. They were then allowed to sit overnight at room temperature and were then re-examined for the scratches. The results are given in TABLE 10:

TABLE 10

|         |                 | Visibility       |                      | Width          |                      |
|---------|-----------------|------------------|----------------------|----------------|----------------------|
| Example | Load (grams)    | As Scratched     | After 18 hrs (rt)    | As Scratched   | After 18 hrs (rt)    |
| C3      | 50              | V                | V                    | 0.050          | 0.052                |
|         | 100             | V                | V                    | 0.079          | 0.078                |
| 39      | 50              | V                | NV                   | 0.070          | NV                   |
|         | 100             | V                | NV                   | 0.085          | 0.019                |
| 40      | 50              | V                | NV                   | 0.069          | NV                   |
|         | 100             | V                | V*                   | 0.076          | 0.042                |

*The coating of Ex. 40 is softer than the 39 coating, and the stylus penetrated through it into the underlying PET surface - this made the scratch permanently visible even though some healing of the clearcoat took place with sitting at room temperature.

What is claimed is:

1. An article comprising the following layers:
(a) a thermoplastic polymer interlayer; and
(b) a polyester film having coated thereon a clearcoat which is the reaction product of either (i) at least one hydroxyl-containing oligomer with at least one isocyanate-containing oligomer, wherein the at least one hydroxyl-containing oligomer has a molecular weight in the range of from about 300 to about 3,000 and is obtained by reacting multifunctional alcohol with cyclic monomer anhydride to obtain an acid oligomer, and further reacting the acid oligomer with monofunctional epoxide, or (ii) at least one anhydride-containing oligomer with at least one epoxide-containing compound.

2. The article of claim 1 wherein the thermoplastic polymer interlayer is laminated to the polyester film with the clear coat on the side facing away from the thermoplastic polymer interlayer.

3. The article of claim 2 wherein (i) the equivalent ratio of epoxide-containing compound to anhydride-containing oligomer is about 0.90 to about 1.30 or (ii) the equivalent ratio of hydroxyl-containing oligomer to isocyanate-containing oligomer is about 0.90 to about 1.35.

4. The article of claim 3 wherein the polyester film is polyethylene terephthalate film.

5. The article of claim 2 wherein the thermoplastic polymer interlayer is a polyurethane interlayers.

6. The article of claim 1 wherein the equivalent ratio of epoxide-containing compound to anhydride-containing oligomer and the equivalent ratio of hydroxyl-containing compound to isocyanate-containing oligomer are at least about 0.90.

7. The article of claim 1 wherein (i) the equivalent ratio of epoxide-containing compound to anhydride-containing oligomer is about 0.90 to about 1.30 or (ii) the equivalent ratio of hydroxyl-containing oligomer to isocyanate-containing oligomer is about 0.90 to about 1.35.

8. The article of claim 1 wherein the polyester film is polyethylene terephthalate film.

9. The article of claim 1 wherein the thermoplastic polymer interlayer is selected from the group consisting of: (i) polyurethane interlayers, (ii) polyvinylbutyral interlayers, and (iii) interlayers of ethylene acid copolymer or derivatives thereof obtained from the copolymerization of ethylene with an α,β-unsaturated carboxylic acid.

10. The article of claim 1 wherein the thermoplastic polymer interlayer is a polyvinylbutyral interlayer.

11. The article of claim 1 wherein the thermoplastic polymer interlayer is an interlayer of ethylene acid copolymer or derivatives thereof obtained from the copolymerization of ethylene with an a α,β-unsaturated carboxylic acid.

12. The article of claim 1 wherein the clearcoat is obtained from the reaction of the at least one hydroxyl-containing oligomer with the at least one isocyanate-containing oligomer.

13. The laminate of claim 12 wherein the equivalent ratio of the at least one hydroxyl-containing oligomer to the at least one isocyanate-containing oligomer is about 0.90 to about 1.35.

14. The article of claim 13 wherein:
the at least one isocyanate-containing oligomer is selected from the group consisting of isocyanurate trimer of hexamethylene diisocyanate and isocyanurate trimer of isophorone diamine.

15. The article of claim 13 wherein:
(a) the at least one hydroxyl-containing oligomer has a molecular weight in of about 500 to about 1,500, and is obtained by reacting multifunctional alcohol selected from the group consisting of pentaerythritol, hexanediol, trimethylol propane, or mixtures thereof, with cyclic monomer anhydrides selected from the group consisting of hexahydrophthalic anhydride, methylhexahydrophthalic anhydride, to obtain an acid oligomer, and further reacting the acid oligomer with monofunctional epoxides selected from the group consisting of butylene oxide, propylene oxide or mixtures thereof;

(b) the at least one isocyanate-containing oligomer is selected from the group consisting of isocyanurate trimer of hexamethylene diisocyanate and isocyanurate trimer of isophrone diamine; and (c) the thermoplastic polymer interlayer is the polyvinylbutyral interlayer.

16. The article of claim 1 prepared by a process comprising the steps:

(a) applying a clearcoat to the polyester film;

(b) curing the clearcoat on the surface of the polyester film;

(c) forming a stack comprising the polyester film with the cured clearcoat on the surface, and the thermoplastic polymer interlayer, with the clearcoat on the side facing away from the thermoplastic polymer interlayer; and (d) laminating the stack to form the article.

17. The article of claim 16 wherein:

(i) the polyester film is polyethylene terephthalate film;

(ii) the thermoplastic polymer interlayer is a polyvinylbutyral interlayer; and (iii) the equivalent ratio of epoxide-containing compound to anhydride-containing oligomer is about 0.90 to about 1.30 or the equivalent ratio of hydroxyl-containing oligomer to isocyanate-containing oligomer is about 0.90 to about 1.35.

18. An article comprising the following layers:

(a) a thermoplastic polymer interlayer; and (b) a polyester film having coated thereon a clearcoat which is the reaction product of at least one anhydride-containing oligomer with at least one epoxide-containing compound.

19. The article of claim 18 wherein the equivalent ratio of epoxide-containing compound to anhydride-containing oligomer is about 0.90 to about 1.30.

20. The article of claim 19 wherein:

(a) the anhydride-containing oligomer has a structure defined by the general formula: R—CO—O—CO—(R'—CO—O—CO)$_n$—R, wherein R is a monosubstituted hydrocarbon group having 2 to 50 carbon atoms, R' is a di-substituted hydrocarbon group having 2 to 50 carbon atoms, the hydrocarbon R and R' groups containing or not containing an ether linkage, urethane linkage, or ester linkage, and n is an integer of 1 to 500; and (b) the at least one epoxide-containing compound is selected from the group consisting of diglycidyl ester of cyclopean dicarboxylic acid and cycloaliphatic epoxies.

21. The article of claim 19 wherein (a) the anhydride-containing oligomer has a molecular weight of less than about 2000 and comprises (1) a central moiety, and (2) greater than one non-cyclic anhydride moieties bonded to each central moiety; and (b) the at least one epoxide-containing compound is selected from the group consisting of diglycidyl ester of cyclohexane dicarboxylic acid and cycloaliphatic epoxies.

22. The article of claim 21 wherein the anhydride-containing oligomer is prepared by reacting pentaerythritol, hexahedron or trimethylol propane with hexaydrophthalic anhydride or methylhexalhydrophthalic anhydride to form an acid and further reacting the acid with ketene.

23. An article consisting essentially of:

(a) a thermoplastic polymer interlayer wherein the thermoplastic polymer interlayer is selected from the group consisting of (i) polyvinylbutyral interlayers and (ii) interlayers of ethylene acid copolymer or derivatives thereof obtained from the copolymerization of ethylene with an α, β-unsaturated carboxylic acid;

(b) a second polymeric layer laminated to the thermoplastic polymer interlayer; and (c) a clear coat coated on the second polymeric layer, wherein the clear coat is on the side opposite the second polymeric layer and comprises a scratch-resistant clear coat obtained from reaction of (A) at least one hydroxyl-containing oligomer with at least one isocyanate-containing oligomer, wherein the at least one hydroxyl-containing oligomer has a molecular weight in the range of from about 300 to about 3,000 and is obtained by reacting multifunctional alcohol with cyclic mononumeric anhydride to obtain an acid oligomer, and further reacting the acid oligomer with monofunctional epoxide, or (B) at least one anhydride-containing oligomer with at least one epoxide-containing compound.

24. The article of claim 23 wherein:

(i) the scratch-resistant clearcoat is obtained from reaction of the at least one hydroxyl-containing oligomer with the at least one isocyanate-containing oligomer;

(ii) the equivalent ratio of hydroxyl-containing oligomer to isocyanate-containing oligomer is about 0.90 to about 1.35, (iii) the second polymeric layer is polyethylene terephthalate film; and (iv) the thermoplastic polymer interlayer is a polyvinylbutyral interlayer.

25. The article of claim 23 wherein:

(i) the scratch-resistant clearcoat obtained from reaction of the at least one anhydride-containing oligomer with the at least one epoxide-containing compound;

(ii) the equivalent ratio of epoxide-containing oligomer to anhydride-containing oligomer is about 0.90 to about 1.30;

(iii) the second polymeric layer is polyethylene terephthalate film; and (iv) the thermoplastic polymer interlayer is a polyvinylbutyral interlayer.

26. The article of claim 23 prepared by a process comprising the steps:

(a) applying the clearcoat to the second polymeric layer;

(b) curing the clearcoat on the surface of the second polymeric layer;

(c) forming a stack comprising the second polymeric layer with the cured clearcoat on the surface, and the thermoplastic polymer interlayer, with the clearcoat on the side facing away from the thermoplastic polymer interlayer; and (d) laminating the stack to form the article; wherein (i) the equivalent ratio of epoxide-containing compound to anhydride-containing oligomer is about 0.90 to about 1.30 or (ii) the equivalent ratio of hydroxyl-containing oligomer to isocyanate-containing oligomer is about 0.90 to about 1.35.

* * * * *